United States Patent
Hamabata

[11] Patent Number: 5,976,438
[45] Date of Patent: Nov. 2, 1999

[54] METHOD OF MANUFACTURING DOOR GLASS RUN FOR MOTOR VEHICLE

[75] Inventor: Mitsuo Hamabata, Nakashima-gun, Japan

[73] Assignee: Toyoda Gosei Co., Ltd., Aichi-ken, Japan

[21] Appl. No.: 09/082,724

[22] Filed: May 21, 1998

[30] Foreign Application Priority Data

May 27, 1997 [JP] Japan .................................. 9-154413

[51] Int. Cl.⁶ .............................. B29C 53/36; B60J 10/02
[52] U.S. Cl. .......................... 264/138; 264/251; 264/295
[58] Field of Search .................................. 264/138, 295, 264/251; 425/112, 108

[56] References Cited

U.S. PATENT DOCUMENTS

| | | | |
|---|---|---|---|
| 4,183,778 | 1/1980 | Mesnel | 156/245 |
| 4,908,989 | 3/1990 | Omura et al. | |
| 4,964,620 | 10/1990 | Omura et al. | |
| 5,035,937 | 7/1991 | Nozaki | 428/122 |
| 5,407,628 | 4/1995 | Nozaki et al. | 264/261 |

FOREIGN PATENT DOCUMENTS 6-134855  5/1994  Japan .

Primary Examiner—Jan H. Silbaugh
Assistant Examiner—Dae Young Lee
Attorney, Agent, or Firm—Pillsbury Madison & Sutro LLP

[57] ABSTRACT

A method of manufacturing a door glass run to be attached along an inner periphery of a door frame of a vehicle door. The method includes forming a door glass run having a main portion of a generally U-shaped cross-section, and seal lips which extend from ends of side walls of the main portion toward the inside thereof by extrusion such that one side wall has a height greater than that of the other side wall, forming first, second and third cutouts in the extruded door glass run from a bottom wall of the main portion to angular parts connecting the bottom wall to the side walls such that the first cutout faces about a center of a corner of the door frame, and the second and third cutouts face about borders between the corner of the door frame and straightly extending parts thereof, bending the door glass run having these cutouts in conformity with the corner of the door frame, and filling these cutouts with molding material to mold a bottom wall and angular parts connecting the bottom wall to side walls therein such that the thickness of the angular part connecting the bottom wall to the side wall having a greater height is increased, as compared to that of a corresponding angular part of the extruded glass run.

4 Claims, 3 Drawing Sheets

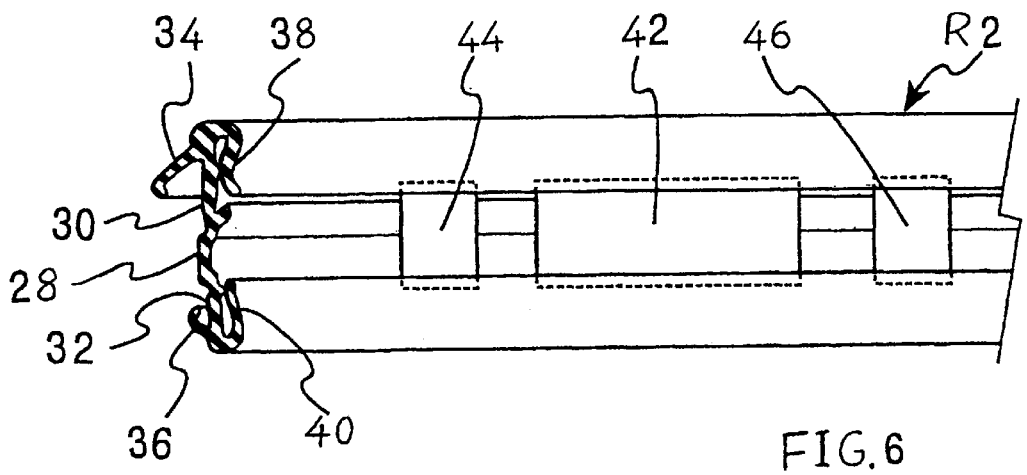
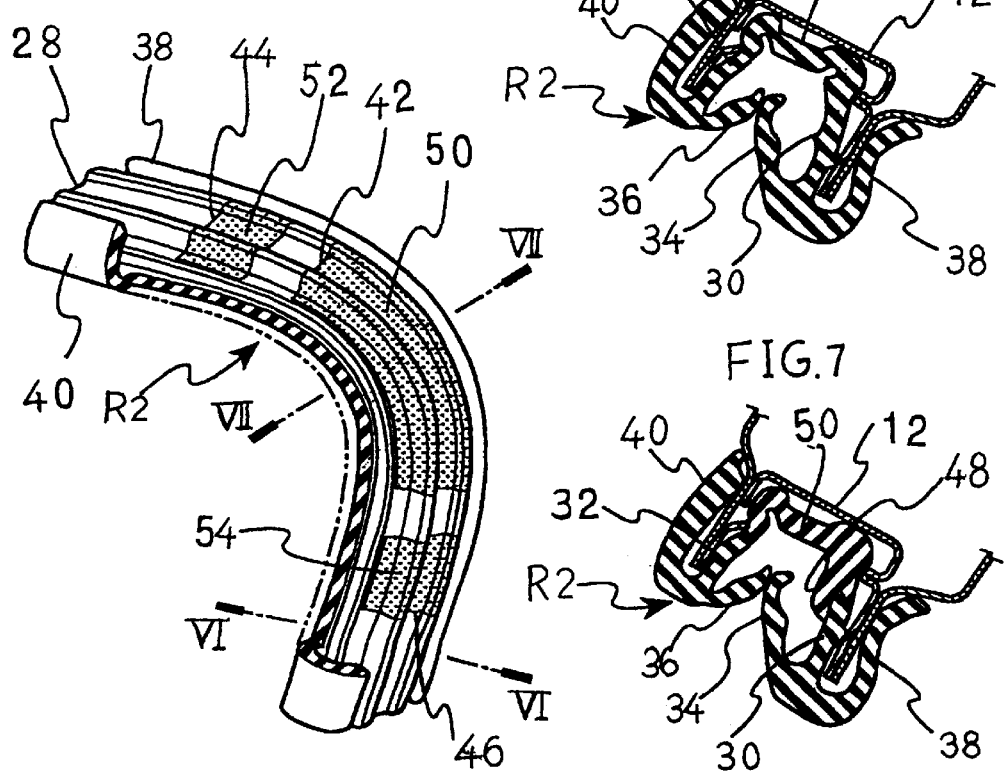

METHOD OF MANUFACTURING DOOR GLASS RUN FOR MOTOR VEHICLE

This application claims the benefits of foreign priority under 35 U.S.C. Section 119 based on Japanese Application No. HEI 9-154413 the contents of which is incorporated herein by reference.

BACKGROUND OF THE INVENTION

1. Field of the Invention

The present invention relates to a method of manufacturing a door glass run to be attached to a door frame of a motor vehicle and, more particularly, to a method of manufacturing a corner part in such a door glass run.

2. Description of Related Art

As illustrated in FIG. 1, a door glass run (hereinafter will be merely called glass run) R is attached along an inner periphery of a door frame 12 of a door 10 of a motor vehicle to guide a door glass 14 to its closed and open positions, and effect a seal between the door glass 14 and door frame 12 when the door glass 14 is fully closed. The glass run has a generally U-shaped cross-section and is formed linearly by extruding solid rubber.

The glass run thus extruded, however, cannot be bent in conformity with a corner of the door frame 12, which curves at right angles, such as a corner C1 in FIG. 1. So, generally, two extruded glass runs have been joined together with a corner member which is molded so as to curve at right angles.

Corner parts of the glass run to be attached to gently curved corners of the door frame 12 such as corners C2 and C3 in FIG. 1 can be obtained by forming a cutout in a bottom wall of an extruded glass run over a length corresponding to the corner of the door frame 12, bending the glass run to a desired corner configuration, placing the bent corner part of the glass run in a mold, and injecting a rubber material into the mold to fill the cutout with the rubber material.

With this method, however, upon bending the glass run having such a cutout, the cross-sectional configuration of the glass run may be irregularly deformed, which makes it difficult to place the glass run in the mold. In addition, upon closing the mold, the glass run thus irregularly deformed may be partly caught between mold members.

To prevent irregular deformation, conventionally, a plurality of lateral slits have been formed separately in a bottom wall of an extruded glass run, and the glass run having the lateral slits has been bent into a desired corner configuration, which results in, as shown in FIG. 2, the slits being opened to define a plurality of notches 16, each having a V-shaped cross-section. Then, the notches 16 have been filled with molding material 18 in a mold (Japanese Patent application-laid open No. Hei 6-134855).

This method for forming a corner part in the glass run may be applied to a corner of the door frame, which curves at right ingles, such as the corner C1 in FIG. 1.

However, when the above method is applied to the door glass run R1 shown in FIG. 3, which has the arrangement that one side wall 20 to be located inwardly upon installed on the door frame 12 has a height greater than that of the other side wall 22 to be located outwardly upon installed on the door frame 12, there occurs the following problem. After removing the molded corner part from the mold, as shown in FIG. 3, the side wall 20 having a volume greater than that of the side wall 22, protrudes upwardly to abut the door frame 12, thus generating a buckle 26 in the side wall 22.

This is caused by the difference in residual stress between the side walls 20 and 22 which have been bent and placed in the mold.

Due to these deformations, the molded corner of the glass run R1 cannot be installed on the door frame 12 in a normal state, whereby the sealing performance around the door glass is lowered.

SUMMARY OF THE INVENTION

It is an object of the present invention to provide a method of manufacturing a glass run, which enables molding of a right-angled corner part in the glass run without generating any undesirable deformation therein.

The method in accordance with the present invention includes the steps of forming a glass run having a main portion of a generally U-shaped cross-section, and seal lips which extend from ends of facing side walls of the main portion toward the inside thereof by extrusion such that one of the side walls has a height greater than that of the other side wall, forming a first cutout in one part of the extruded glass run, which is adapted to be attached to about a center of a corner of a door frame, so as to have a width corresponding to a bottom wall of the main portion and angular parts on both sides thereof, and have a length corresponding to an entire length of the center of the corner of the door frame, and second and third cutouts in another parts of the extruded glass run, which are adapted to be attached to about a border between the corner of the door frame and straightly extending parts thereof, so as to have a width identical to that of the first cutout, bending the glass run having the first, second and third cutouts in conformity with the corner of the door frame, and placing a bent corner part of the glass run in a mold, injecting molding material into the mold to fill the first, second and third cutouts with the molding material to form a bottom wall and angular parts such that the thickness of the angular part which connects the bottom wall to the side wall having a greater height is increased, as compared to the other angular part.

Two kinds of cutouts enable the glass run to be bent at right angles. With the arrangement that an uncut parts are provided between two kinds of cutouts, the cross-section of the glass run can be prevented from being greatly deformed upon bending at right angles, and the bent glass run can be placed in the mold without being caught between mold members. Furthermore, with the arrangement that the thickness of the angular part which connects the bottom wall to the side wall having a greater height is increased, deformation which would occur upon removing from the mold due to the difference in volume between the side walls can be prevented by virtue of the rigid angular part having an increased thickness.

Other objects, features, and characteristics of the present invention will become apparent upon consideration of the following description and the appended claims with reference to the accompanying drawings, all of which form a part of this specification.

BRIEF DESCRIPTION OF THE DRAWING

FIG. 4 is a plan view of an extruded glass run partly cut with a method of the present invention;

FIG. 5 is a partially cut away perspective view of a corner part of a glass run, which is obtained by molding with a method of the present invention;

FIG. 6 is a cross-sectional view of the glass run installed on a door frame, taken along the line VI—VI of FIG. 5; and FIG. 7 is a cross-sectional view of the glass run installed on the door frame, taken along the line VII—VII of FIG. 5.

DETAILED DESCRIPTION OF THE PRESENTLY PREFERRED EXEMPLARY EMBODIMENTS

Figure 1:
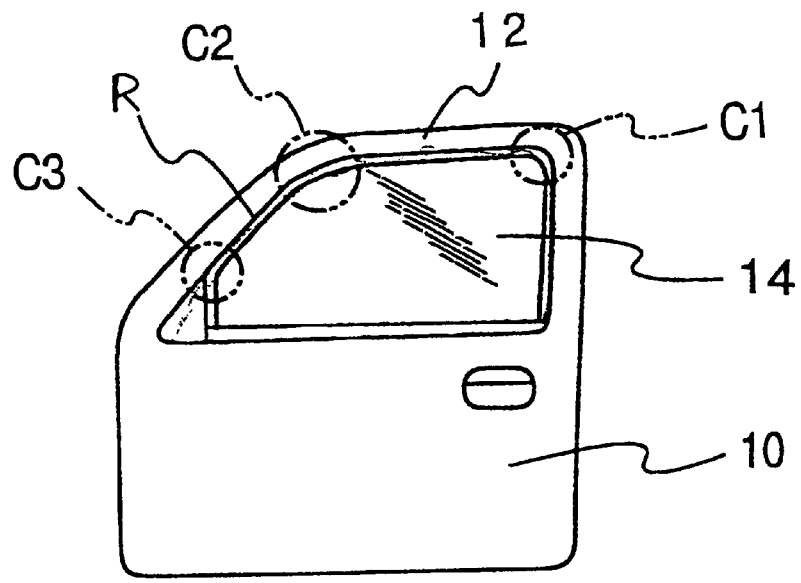
FIG. 1 is a front view of a front door of a motor vehicle on which a glass run is installed.

FIGS. 4, 5, 6 and 7 illustrate one embodiment of the present invention. As shown in FIG. 6, a glass run R2 is composed of rubber and includes a main portion of a generally U-shaped cross-section, which has a bottom wall 28 and side walls 30 and 32, seal lips 34 and 36 which extend from ends of the side walls 30 and 32 toward the inside of the main portion, and molding lips 38 and 40 which extend from the ends of the side walls 30 and 32 toward the outside of the main portion.

The side wall 30 and seal lip 34 are respectively made longer than the side wall 32 and seal lip 36. The glass run R2 thus arranged is installed on a door frame 12 having a generally U-shaped cross-section by fitting the main portion of the glass run R2 in the door frame 12 such that side walls of the door frame 12 are respectively inserted between the side wall 30 and the molding lip 38 and between the side wall 32 and the molding lip 40.

As shown in FIG. 4, the glass run R2 is formed linearly by extrusion into the configuration that the main portion is in an open state.

FIGS. 4 and 5 respectively illustrate one part of the glass run R2, which is to be attached along the corner C1 of the door frame 12 (FIG. 1). A first cutout 42, second cutout 44 and third cutout 46 are formed by cutting out the bottom wall 28 and both angular parts connecting the bottom wall 28 and side walls 30 and 32, respectively, with uncut parts remaining between the first cutout 42 and second cutout 44 and between the first cutout 42 and third cutout 46 by about 8 to 15 mm, respectively.

The first cutout 42 is continuously formed so as to have a length corresponding to an entire length of a center of a corner of the door frame 12. The second cutout 44 is formed at the position corresponding to a border between an end of the corner of the door frame 12 and a straight part extending in a horizontal direction thereof. The third cutout 46 is formed at the position corresponding to a border between the other end of the corner of the door frame 12 and a straight part extending in a vertical direction thereof. The second and third cutouts 44 and 46 have an approximately identical length which is less than that of the first cutout 42.

Then, the extruded glass run R2 thus arranged is bent such that a center of corner of a resultant corner part curves like an arc and a horizontal part and vertical part of the bent glass run R2 intersect at approximate right angles with respect to each other. This results in the first, second and third cutouts 42, 44 and 46 being enlarged in the longitudinal direction of the glass run R2. Next, the corner part of the glass run R2 is placed in a cavity of a mold (not shown).

By virtue of the relatively long first cutout 42 formed at the corner part of the glass run R2, the bending operation can be carried out easily. And by virtue of the uncut parts provided at ends of the corner part of the glass run R2, there does not occur any remarkable deformation of the cross-section, which enables the corner part of the glass run R2 to be placed in the cavity of the mold in a closely fitted state, and consequently, the mold can be closed without any catching of the glass run R2 between mold members.

Then, molding material of solid rubber is injected into the cavity to fill the first, second and third cutouts 42, 44 and 46, thus providing molded parts 50, 52 and 54, each including the bottom wall 28 and angular parts therein. Upon molding, as shown in FIG. 7, the thickness of the angular part connecting the bottom wall 28 to the side wall 30 is increased toward the inside of the main portion, as compared to that of a corresponding angular part of the extruded glass run, thus providing a thick-walled angular part 48. The thick-walled angular part 48 has a thickness 1.5 to 2.0 times as large as that of the corresponding angular part of the extruded glass run. This thick-walled angular part 48 can be formed easily by properly adjusting the configuration of the cavity of the mold.

Figure 3:
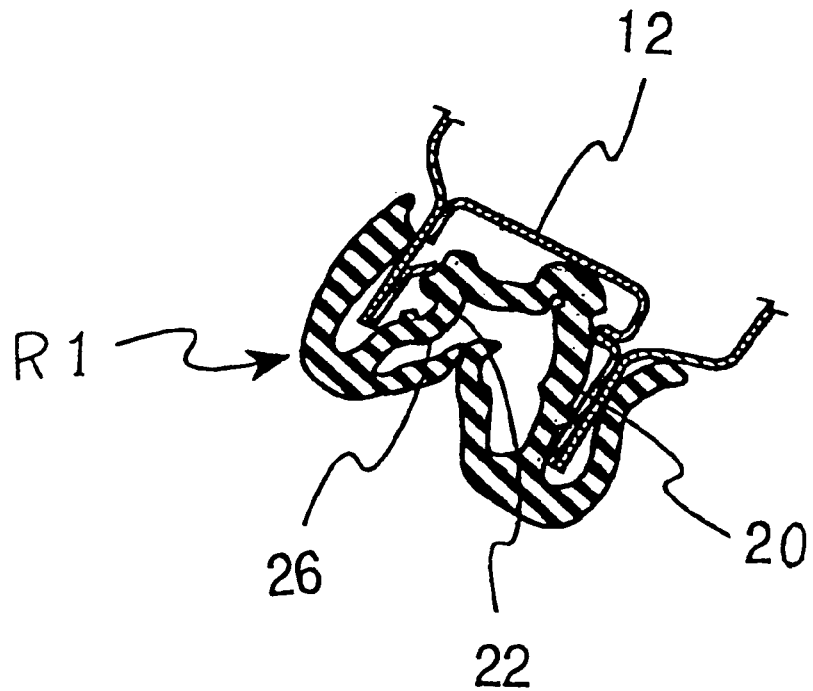
FIG. 3 is a cross-sectional view of the door glass run installed on the motor vehicle, which is taken along the line III—III of FIG. 2, which illustrates one problem of the conventional method.

After molding, the glass run R2 is removed from the mold. To the corner part of the glass run R2, a force which would protrude the side wall 30 having a larger volume is applied due to residual stress of the uncut parts thereof, similarly to the case of the conventional glass run R1 shown in FIG. 3. With the method of the present invention, however, since the molded part 50 is formed in the first cutout 42 having a relatively great length and the uncut parts are reduced, as compared to the conventional glass run R1, residual stress occurring in the glass run R2 is smaller than that in the glass run R1. Furthermore, since the thick-walled angular part 48 is formed so as to connect the bottom wall 28 to the side wall 30 of the molded parts 50, 52 and 54, the corner part of the glass run R2 has rigidity against the residual stress, and consequently, no deformation would be generated.

Figure 2:
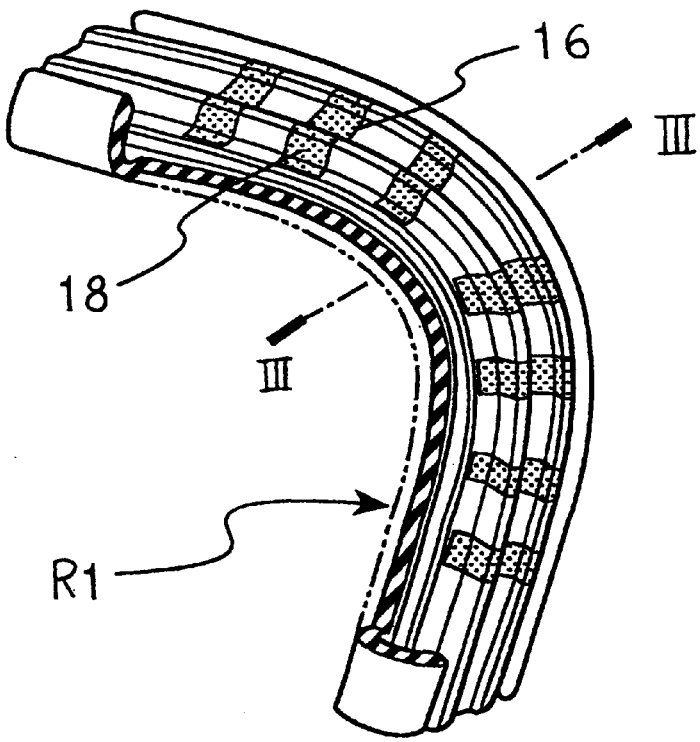
FIG. 2 is a partially cut away perspective view of a corner part of a glass run formed with a conventional method.

The corner parts of the glass run R2 to be installed on the corners C2 and C3 of the door frame 12 (FIG. 1), each curving gently, may be formed similarly by the method of the present invention, or may be formed by the conventional method shown in FIG. 2.

The resultant glass run R2 having the corner part thus molded is installed on the door frame 12 with the side wall 30 located inwardly, as shown in FIG. 7. With the present invention, the corner part of the glass run R2, which curves at right angles, can have a cross-section substantially identical to that of the straight parts thereof, and consequently, can be installed on the door frame 12 similarly to the straight parts thereof. Thus, the corner part exhibits good external appearance and good sealing properties.

With the method in accordance with the present invention, upon bending the glass run at right angles, deformation of the cross-section can be reduced so as to facilitate the operation of placing the glass run in the mold, and, after molding, there scarcely occurs any deformation of the cross-section due to the residual stress caused by the bending operation. Consequently, a predetermined configuration of the corner part of the glass run can be maintained.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing a door glass run to be attached along an inner periphery of a door frame of a vehicle door, comprising:

forming a door glass run having a main portion a generally U-shaped cross-section, and seal lips which extend from ends of facing side walls of said main portion toward an inside thereof by extrusion such that one of said side walls has a height greater than that of the other side wall;

forming a first cutout in one part of said extruded door glass run, which is adapted to be attached to about a center of a corner of the door frame, from a bottom wall of said main portion to angular parts connecting said bottom wall to said facing side walls thereof, and a second cutout and third cutout in another parts of said extruded door glass run, which are adapted to be attached to about a border between said corner of said door frame and straightly extending parts thereof, from a bottom wall of said main portion to angular parts connecting said bottom wall to said facing side walls thereof such that said second and third cutouts have an approximately identical length which is less than a length of said first cutout, bending said door glass run including said first cutout, said second cutout and said third cutout in conformity with the corner of the door frame to form a corner part, and placing said corner part of said door glass run in a mold;

injecting molding material into said mold to fill said first cutout, and second cutout and said third cutout with said molding material to form a bottom wall and angular parts connecting said bottom wall to said side walls in each of said first cutout, said second cutout and said third cutout by molding such that a thickness of one of said angular parts, which connects said one side wall having a greater height, is increased toward the inside of said door glass run, as compared to that of a corresponding angular part of said extruded glass run; and removing said corner part of said glass run from said mold.

2. A method as claimed in claim 1, wherein said straightly extending parts extend in directions intersecting at approximate right angles, and a center of a corner of said corner part of said glass run curves like an arc.

3. A method as claimed in claim 2, wherein said first cutout is formed continuously along said arc-like center of the corner of said corner part of said door glass run.

4. A method as claimed in claim 1, wherein said one angular part has a thickness 1.5 to 2.0 times as large as that of said corresponding angular part of said extruded door glass run.

* * * * *